(12) United States Patent
Warrier et al.

(10) Patent No.: US 12,536,000 B2
(45) Date of Patent: Jan. 27, 2026

(54) METHOD AND SYSTEM FOR AUTOMATICALLY GENERATING CODES TO OPERATE ML MODELS

(71) Applicant: HCL Technologies Limited, New Delhi (IN)

(72) Inventors: Harikrishna C Warrier, Bengaluru (IN); Yogesh Gupta, Noida (IN); Banish Bansal, Bengaluru (IN); Dhanyamraju Sum Prasad, Hyderabad (IN)

(73) Assignee: HCL Technologies Limited, New Delhi (IN)

( * ) Notice: Subject to any disclaimer, the term of this patent is extended or adjusted under 35 U.S.C. 154(b) by 232 days.

(21) Appl. No.: 18/402,812

(22) Filed: Jan. 3, 2024

(65) Prior Publication Data
US 2024/0231769 A1 Jul. 11, 2024

(30) Foreign Application Priority Data
Jan. 5, 2023 (IN) .............................. 202311001157

(51) Int. Cl.
*G06F 8/35* (2018.01)
*G06F 11/34* (2006.01)

(52) U.S. Cl.
CPC ............ *G06F 8/35* (2013.01); *G06F 11/3495* (2013.01)

(58) Field of Classification Search
CPC ............................... G06F 8/35; G06F 11/3495
USPC ....................................................... 717/104
See application file for complete search history.

(56) References Cited

U.S. PATENT DOCUMENTS

| 8,230,343 | B2 | 7/2012 | Logan et al. |
| 8,332,337 | B2 | 12/2012 | Harrison et al. |
| 8,396,804 | B1 | 3/2013 | Dala et al. |
| 8,918,739 | B2 | 12/2014 | Butin et al. |
| 9,135,151 | B2 | 9/2015 | Betak et al. |
| 9,424,167 | B2 | 8/2016 | Lee et al. |
| 9,489,630 | B2 | 11/2016 | Achin et al. |
| 9,602,738 | B2 | 3/2017 | Choe et al. |

(Continued)

OTHER PUBLICATIONS

Le, Triet HM, Hao Chen, and Muhammad Ali Babar. "Deep learning for source code modeling and generation: Models, applications, and challenges." ACM Computing Surveys (CSUR) 53.3 (2020): pp. 1-38. (Year: 2020).*

(Continued)

*Primary Examiner* — Satish Rampuria
(74) *Attorney, Agent, or Firm* — Kendal M. Sheets

(57) ABSTRACT

A method for automatically generating codes to operate Machine Learning (ML) models disclosed. In some embodiments, the method includes operating, for each of a plurality of stages associated with ML model operations, at least one ML model. To operate each of the at least one ML model, the method may include selecting, for each of the at least one ML model at each of the plurality of stages, a predefined technique associated with a current stage; generating, for each of the at least one ML model at each of the plurality of stages, a code based on the selected predefined technique; generating, for each of the at least one ML model at each of the plurality of stages, a dependency configuration and an environment configuration for the generated code; and generating, for each of the at least one ML model, a pipeline configuration for execution of associated codes.

18 Claims, 10 Drawing Sheets

(56) References Cited

U.S. PATENT DOCUMENTS

| | | |
|---|---|---|
| 9,652,846 B1 | 5/2017 | Codella et al. |
| 9,710,767 B1 | 7/2017 | Dietrich et al. |
| 9,779,492 B1 | 10/2017 | Garnavi et al. |
| 10,466,978 B1 | 11/2019 | Vidan et al. |
| 10,614,382 B1 | 4/2020 | Wu |
| 11,144,289 B1 | 10/2021 | Hwang et al. |
| 11,238,377 B2 * | 2/2022 | Polleri .................. G06N 20/00 |
| 11,392,855 B1 | 7/2022 | Murakonda et al. |
| 12,253,932 B1 * | 3/2025 | Schumacher ....... G06F 11/3438 |
| 2007/0112574 A1 | 5/2007 | Greene |
| 2007/0168228 A1 | 7/2007 | Lawless |
| 2007/0239769 A1 | 10/2007 | Fazal et al. |
| 2009/0089078 A1 | 4/2009 | Bursey |
| 2009/0172047 A1 | 7/2009 | Boyko et al. |
| 2010/0114806 A1 | 5/2010 | Harrison et al. |
| 2010/0153382 A1 | 6/2010 | Vidov et al. |
| 2011/0313969 A1 | 12/2011 | Ramu |
| 2012/0290412 A1 | 11/2012 | Marovets |
| 2013/0066717 A1 | 3/2013 | Marovets |
| 2013/0095864 A1 | 4/2013 | Marovets |
| 2013/0191185 A1 | 7/2013 | Galvin |
| 2014/0164507 A1 | 6/2014 | Tesch et al. |
| 2014/0172490 A1 | 6/2014 | Snyder |
| 2015/0163254 A1 | 6/2015 | Romero |
| 2015/0213793 A1 | 7/2015 | Phelan et al. |
| 2016/0085754 A1 | 3/2016 | Gifford et al. |
| 2016/0179895 A1 | 6/2016 | Cosma et al. |
| 2016/0275406 A1 | 9/2016 | Chan et al. |
| 2017/0063886 A1 | 3/2017 | Muddu et al. |
| 2017/0098282 A1 | 4/2017 | Klemm et al. |
| 2017/0104627 A1 | 4/2017 | Bender et al. |
| 2017/0124269 A1 | 5/2017 | Mcnair et al. |
| 2017/0124487 A1 | 5/2017 | Szeto et al. |
| 2017/0132817 A1 | 5/2017 | Mahajan et al. |
| 2017/0185904 A1 | 6/2017 | Padmanabhan et al. |
| 2018/0054524 A1 | 2/2018 | Dahan et al. |
| 2018/0152522 A1 | 5/2018 | White |
| 2018/0165604 A1 | 6/2018 | Minkin et al. |
| 2018/0204239 A1 | 7/2018 | Licht et al. |
| 2018/0211373 A1 | 7/2018 | Stoppa et al. |
| 2018/0247320 A1 | 8/2018 | Gauld |
| 2019/0026685 A1 | 1/2019 | Chappell et al. |
| 2019/0164140 A1 | 5/2019 | Pasupula |
| 2019/0228461 A1 | 7/2019 | Domokos et al. |
| 2019/0361626 A1 | 11/2019 | East |
| 2020/0044823 A1 | 2/2020 | Savir et al. |
| 2020/0184349 A1 * | 6/2020 | Bhokare .................. G06F 8/33 |
| 2020/0274830 A1 | 8/2020 | Swami et al. |
| 2020/0274894 A1 | 8/2020 | Argoeti et al. |
| 2020/0311688 A1 | 10/2020 | Lipman et al. |
| 2020/0372625 A1 | 11/2020 | Dal Mutto et al. |
| 2020/0387812 A1 | 12/2020 | Lewis et al. |
| 2021/0081377 A1 * | 3/2021 | Polleri ...................... G06F 8/75 |
| 2021/0081848 A1 | 3/2021 | Polleri et al. |
| 2021/0133650 A1 | 5/2021 | Cella et al. |
| 2021/0135856 A1 | 5/2021 | Adibi |
| 2021/0192538 A1 | 6/2021 | Varvarian et al. |
| 2021/0326717 A1 | 10/2021 | Mueller et al. |
| 2021/0334735 A1 | 10/2021 | Meszaros et al. |
| 2022/0004897 A1 | 1/2022 | Jadon et al. |
| 2022/0210274 A1 | 6/2022 | Dahan et al. |
| 2022/0300520 A1 | 9/2022 | Warrier et al. |
| 2022/0300821 A1 | 9/2022 | Wang et al. |
| 2022/0301001 A1 | 9/2022 | Patil et al. |
| 2023/0237348 A1 * | 7/2023 | Polleri .................. G06F 16/252 706/12 |

OTHER PUBLICATIONS

Allamanis, Miltiadis, et al. "A survey of machine learning for big code and naturalness." ACM Computing Surveys (CSUR) 51.4 (2018): pp. 1-37. (Year: 2018).*

Ashmore, Rob, Radu Calinescu, and Colin Paterson. "Assuring the machine learning lifecycle: Desiderata, methods, and challenges." ACM computing surveys (CSUR) 54.5 (2021): pp. 1-39. (Year: 2021).*

MLOps: Continuous delivery and automation pipelines in machine learning; Cloud Architecture Center; pp. 1 to 18.

* cited by examiner

| A.I. ON | AutoML & Data Science Platform | Use Case: Not Defined Version: 0 Status: Not Trained Compute Infrastructure: Local ▽ |
|---|---|---|

Manage | Trained Models | System Settings
Train
Predict
Monitor
Xplan
MLTest
MLLite Use Cases

⚙ NEW USE CASE

Use Case: AION_23

Description: [         ]

[ Submit ]

⚙ USE CASE LIST

Show [▽]    Search [    ]

| ID△ | UseCaseName⇕ | Delete⇕ | Retrain⇕ | Publish⇕ |
|---|---|---|---|---|
| 1 | AION_1 | 🗑 | ↑ | △ |
| 2 | AION_2 | 🗑 | ↑ | △ |
| 3 | AION_3 | 🗑 | ↑ | △ |
| 4 | AION_4 | 🗑 | ↑ | △ |
| 5 | AION_5 |   |   |   |

Showing 1 to 5 of 22 records    ◁ 1 2 4 5 ▷

AI Lifecycle Management Platform  Use Case: AION_23  Version: 1  Status: Not Trained  Compute Infrastructure: Local

A.I. ON

Predict
Monitor
Xplan
MLTest
MLLite

Model Name: AION_23

Version: 1

Problem Type:
- Classification
- Classification
- Regression
- TimeSeries
- RecommenderSystem
- Clustering
- AnomalyDetection
- SurvivalAnalysis
- VideoForecasting
- ImageClassification
- TopicModelling
- ObjectDetection
- StateTransition Row Filtering  Add Filter Model Features
sentiment
text Data Time Features
Not Applicable
sentiment
text Index Features
Not Applicable
sentiment
text Target Features
sentiment

600C

METHOD AND SYSTEM FOR AUTOMATICALLY GENERATING CODES TO OPERATE ML MODELS

TECHNICAL FIELD

Generally, the invention relates to Machine Learning (ML). More specifically, the invention relates to method and system for automatically generating codes to operate ML models.

BACKGROUND

In current technological world, Artificial Intelligence (AI) and Machine Learning (ML) are being adopted in industries at a fast pace. The real challenge that is emerging is not in building an ML model, but in developing an integrated data analytics system for the ML model, and to continuously operate the integrated data analytics system in production. In order to develop the data analytics system, a code needs to be written for each stage (i.e., data pre-processing, feature selection model training, model validation, model deployment, and model monitoring) present in a pipeline of a data analytics cycle.

However, existing mechanisms used for generating the code for each stage in the pipeline of the data analytics cycle is almost manual with some configurable options. Additionally, in almost all data analytics process, data scientists spend a considerable amount of time writing plumbing code which is needed to operationalize the ML process. Moreover, since all possible permutations and combinations of the pipeline are quite staggering, maximum amount of time and money is consumed in productionizing of the code. Further, generating code for each and every possible combination is not a simple automation exercise and needs to be dynamic based on the pipeline that is finally being used for a particular use case.

Therefore, there is a need of implementing an efficient and reliable mechanism for automatically generating codes to operate Machine Learning (ML) models.

SUMMARY OF INVENTION

In one embodiment, a method for automatically generating codes to operate Machine Learning (ML) models is disclosed. The method may include operating, for each of a plurality of stages associated with ML model operations, at least one ML model. To operate each of the at least one ML model, the method may include selecting, for each of the at least one ML model at each of the plurality of stages, a predefined technique from a plurality of predefined techniques associated with a current stage of the plurality of stages. It should be noted that, the predefined technique for an ML model for a stage may be selected based on at least one of user defined criteria. To operate each of the at least one ML model, the method may further include generating, for each of the at least one ML model at each of the plurality of stages, a code based on a predefined technique selected for a current stage from the plurality of stages. To operate each of the at least one ML model, the method may further include generating, for each of the at least one ML model at each of the plurality of stages, a dependency configuration for the generated code based on the generated code and at least one of the user defined criteria. To operate each of the at least one ML model, the method may further include generating, for each of the at least one ML model at each of the plurality of stages, an environment configuration for the generated code based on at least one of user defined criteria. To operate each of the at least one ML model, the method may further include generating, for each of the at least one ML model, a pipeline configuration for execution of associated codes generated for each of the plurality of stages, based on the associated dependency and environment configuration.

In another embodiment, a system for automatically generating codes to operate Machine Learning (ML) models is disclosed. The system includes a processor and a memory communicatively coupled to the processor. The memory may store processor-executable instructions, which, on execution, may cause the processor to operate, for each of a plurality of stages associated with ML model operations, at least one ML model. To operate each of the at least one ML model, the processor-executable instructions, on execution, may further cause the processor to, select, for each of the at least one ML model at each of the plurality of stages, a predefined technique from a plurality of predefined techniques associated with a current stage of the plurality of stages. It should be noted that, the predefined technique for an ML model for a stage may be selected based on at least one of user defined criteria. To operate each of the at least one ML model, the processor-executable instructions, on execution, may further cause the processor to, generate, for each of the at least one ML model at each of the plurality of stages, a code based on a predefined technique selected for a current stage from the plurality of stages. To operate each of the at least one ML model, the processor-executable instructions, on execution, may further cause the processor to, generate, for each of the at least one ML model at each of the plurality of stages, a dependency configuration for the generated code based on the generated code and at least one of the user defined criteria. To operate each of the at least one ML model, the processor-executable instructions, on execution, may further cause the processor to generate, for each of the at least one ML model at each of the plurality of stages, an environment configuration for the generated code based on at least one of user defined criteria. To operate each of the at least one ML model, the processor-executable instructions, on execution, may further cause the processor to generate, for each of the at least one ML model, a pipeline configuration for execution of associated codes generated for each of the plurality of stages, based on the associated dependency and environment configuration.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

FIGS. 6A-6E represent graphical user interfaces (GUIs) depicting technique used for creating at least one executable for operating ML models are represented, in accordance with an exemplary embodiment, in accordance with an exemplary embodiment.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
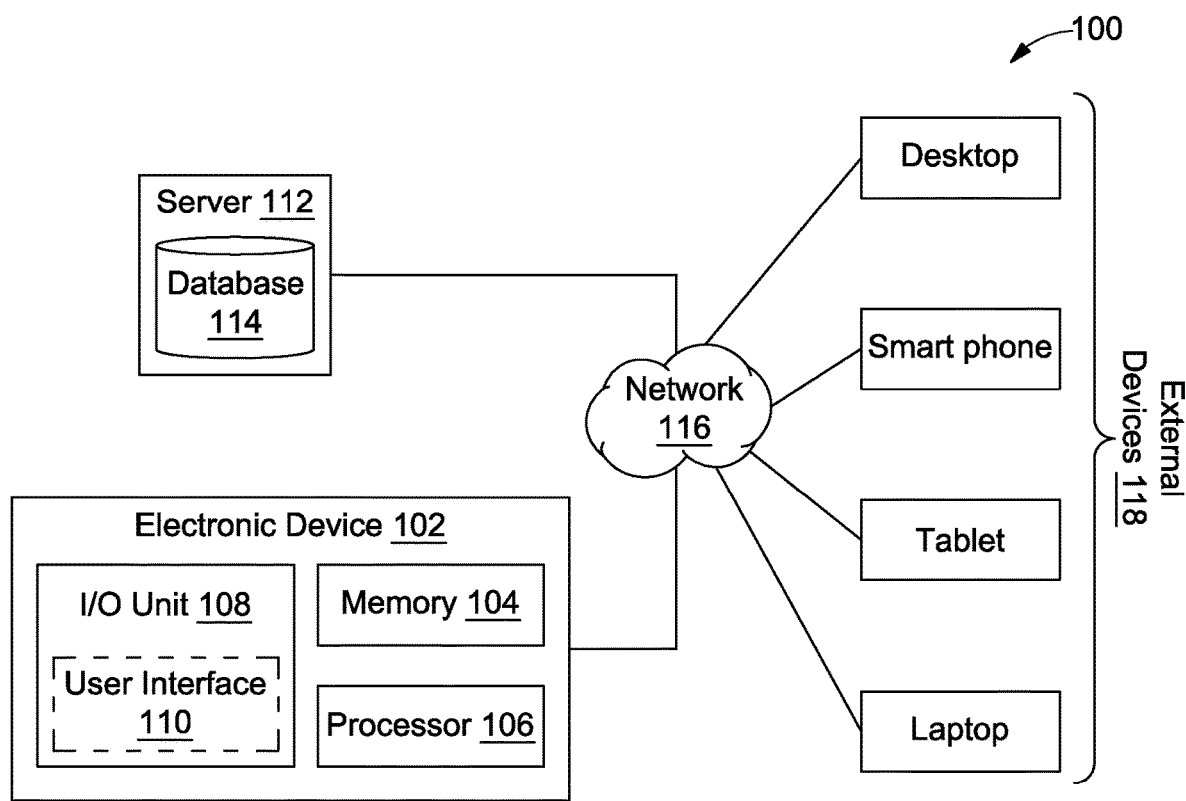
FIG. 1 illustrates a functional block diagram of a system configured to automatically generate codes to operate Machine Learning (ML) models, in accordance with an embodiment.

A functional block diagram of a system 100 configured to automatically generate codes to operate Machine Learning (ML) models is illustrated in FIG. 1, in accordance with an embodiment. In order to generate codes for each of a plurality of stages, the system 100 may include an electronic device 102. The electronic device 102 may be configured to generate the temporal token file. As will be appreciated, the electronic device 102 may generate codes for each of the plurality of stages associated with ML model operations in order to operate at least one ML model. In an embodiment, the at least one ML model may be present within a memory 104 of the electronic device 102. The plurality of stages may include at least one of: data pre-processing, feature selection, model training, model validation, model deployment, or model monitoring.

In order to generate a code for each of the plurality of stages, initially, the electronic device 102 may be configured to receive at least one of user defined criteria. In an embodiment, the user defined criteria may include at least one of details associated with a use case, data to be used for training, learning attributes, and environmental attributes. Further, details associated with the use case may include at least one of problem type and features associated with the use case. The data to be used for training may correspond to a training dataset created by the user. The learning attributes may include at least one of data transformation, feature engineering, model training, or prediction. The environment attributes may include at least one of operating system environment, configuration management environment, containerization attributes, or cloud or on-premises attributes.

Upon receiving the at least one of the user defined criteria, the electronic device 102 may select a predefined technique from a plurality of predefined techniques for each of the at least one ML model at each of the plurality of stages. In an embodiment, the predefined technique may be associated with a current stage of the plurality of stages. Further, the predefined technique for an ML model for a stage may be selected based on the at least one of the user defined criteria. Once the predefined technique is selected, the electronic device 102 may be configured to generate the code for each of the at least one ML model at each of the plurality of stages. The code may be generated based on the predefined technique selected for the current stage from the plurality of stages. In an embodiment, the electronic device 102 may generate the code by creating a code configuration based on the selected predefined technique and at least one of the user defined criteria.

Further, the electronic device 102 may generate a dependency configuration for the generated code based on the generated code and the at least one of the user defined criteria. The dependency configuration may be generated for each of the at least one ML model at each of the plurality of stages. Once the dependency configuration is generated, the electronic device 102 may be configured to generate an environment configuration for the generated code based on the at least one of the user defined criteria. In an embodiment, the environment configuration may be generated for each of the at least one ML model at each of the plurality of stages.

Once the environment score is generated, the electronic device 102 may generate a pipeline configuration for execution of associated codes generated for each of the plurality of stages. Moreover, the pipeline configuration may be generated for each of the at least one ML model. The pipeline configuration may be generated based on the associated dependency and environment configuration. The electronic device 102 may generate the pipeline configuration to operate the at least one ML model. Further, in order to operate each of the at least one ML model, the electronic device 102 may create at least one executable. In an embodiment, the at least one executable may include a container, a code executable, and a pipeline executable. Further, the electronic device 102 may determine a performance score for each of the at least one ML model. The performance score may be determined based on associated operation in each of the plurality of stages. Further, based on the determined performance score, the electronic device 102 may select an ML model from each of the at least one ML model for deployment. In an embodiment, the selected ML model may have highest performance score. Further, in some embodiment, the ML model may be selected based on user requirement.

Examples of the electronic device 102 may include, but is not limited to, a mobile phone, a laptop, a desktop, or a PDA, an application server, and so forth. The electronic device 102 may further include the memory 104, a processor 106, and an Input/Output unit 108. The I/O unit 108 may further include the user interface 110. A user (e.g., a data scientist or a data analyst) or an administrator may interact with the electronic device 102 and vice versa through the I/O unit 108.

The I/O unit 108 may be used to display results (i.e., the code configuration, the generated code, the at least one of the user defined criteria, the pipeline configuration, the performance score, etc.) based on actions performed by the electronic device 102, to the user. The user interface 110 may be used by the user to provide inputs to the electronic device 102. Thus, for example, in some embodiment, the electronic device 102 may ingest an input that includes the at least one of the user defined criteria. Further, in some another embodiment, the electronic device 102 may ingest an input that includes problem type and features. Further, for example, in some embodiments, the electronic device 102 may render intermediate results (e.g., the code configuration, the generated code, the at least one of the user defined criteria, the pipeline configuration) or final results (e.g., the performance score of each of the at least one model, and the selected model) to the user via the user interface 110.

The memory 104 may store instructions that, when executed by the processor 106, may cause the processor 106 to automatically generate codes to operate ML model. The processor 106 may generate codes for the plurality of stages of each of the at least one ML model. As will be described in greater detail in conjunction with FIG. 2 to FIG. 5, in order to operate the at least one ML model, the processor 106 in conjunction with the memory 104 may perform various functions including selecting a predefined technique for each of the at least one ML model at each of the plurality of stages, generating, for each of the at least one ML model at each of the plurality of stages, a code based on the predefined technique, generating, for each of the at least one ML model at each of the plurality of stages, a dependency configuration for the generated code, generating, for each of the at least one ML model at each of the plurality of stages, an environment configuration for the generated code, generating, for each of the at least one ML model, a pipeline configuration for execution of associated codes generated for each of the plurality of stages, etc.

The memory 104 may also store various data (e.g., the plurality of stages, the plurality of pre-defined techniques, the generated code, the dependency configuration, the environment configuration, the pipeline configuration, etc.) that may be captured, processed, and/or required by the electronic device 102. The memory 104 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.).

Further, the electronic device 102 may interact with a server 112 or external devices 118 over a network 116 for sending and receiving various data. The network 116, for example, may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

In an embodiment, the electronic device 102 may fetch information regarding the plurality of stages from the server 112. In addition, the server 112 may provide information, such as, information about the learning attributes, the environment attributes, etc. to the user. The server 112 may further include a database 114. By way of an example, the database 114 may store information regarding the plurality of stages associated with ML model operations. The database 114 may be periodically updated based on updates in each of the plurality of stages. Alternatively, the electronic device 102 may receive input from the user from one of the external devices 118. In some embodiment, a memory of each of the external devices 118 may include one or more ML models. This complete process followed by the system 100 is further explained in detail in conjunction with FIG. 2 to FIG. 5.

Figure 2:
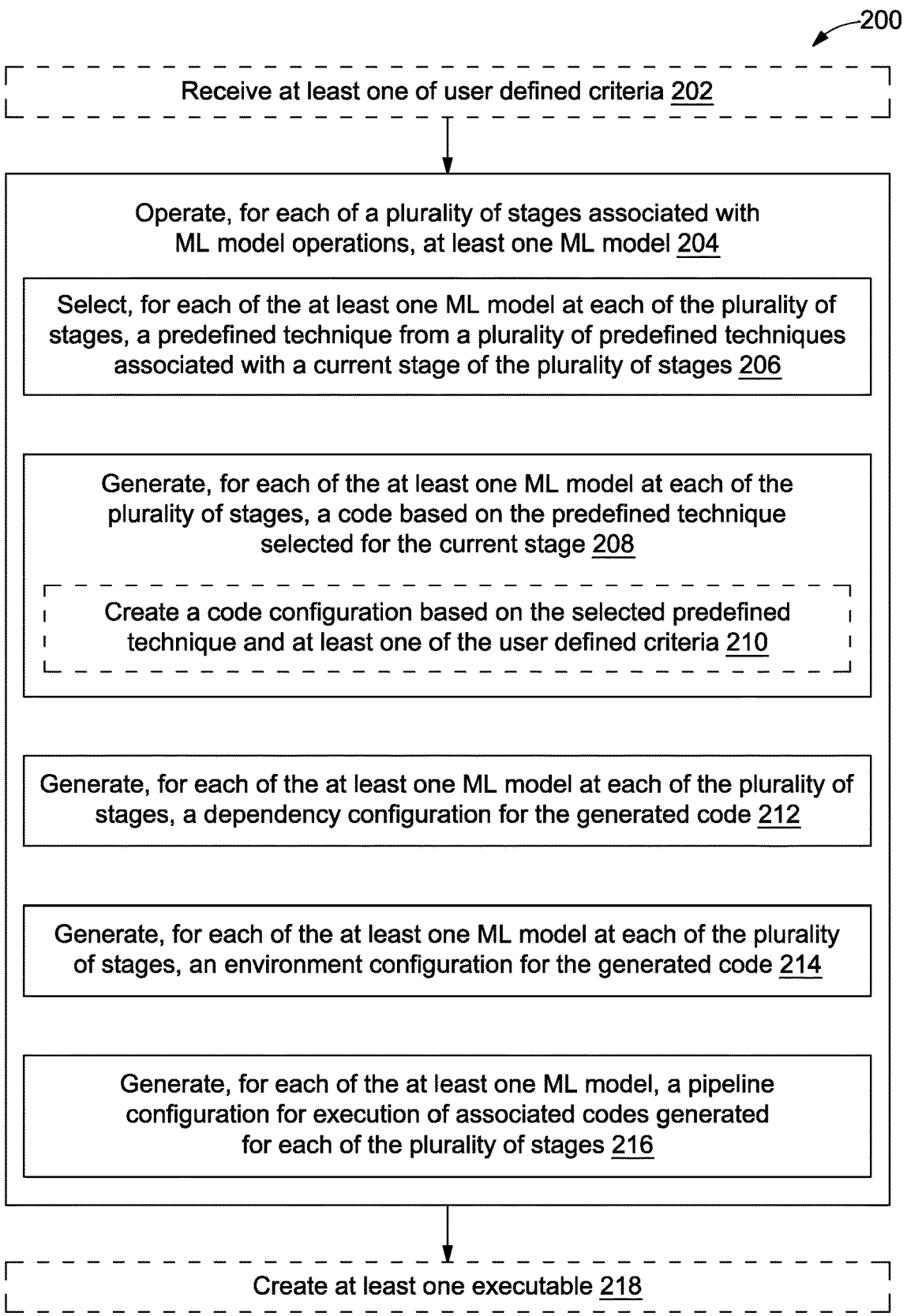
FIG. 2 illustrates a flowchart of a method for automatically generating codes to operate Machine Learning (ML) models, in accordance with an embodiment.

Referring now to FIG. 2, a flowchart 300 of a method for automatically generating codes to operate Machine Learning (ML) models is illustrated, in accordance with an embodiment. In order to automatically generate codes for each of a plurality of stages associated with ML model operations, initially, at step 302, at least one of user defined criteria may be received. The plurality of stages may include at least one of: data pre-processing, feature selection, model training, model validation, model deployment, or model monitoring.

It should be noted that, the at least one user defined criteria may be received from a user (e.g., a data analyst or a data scientist). In an embodiment, the user defined criteria may include at least one of details associated with a use case, data to be used for training, learning attributes, and environmental attributes. Further, details associated with the use case may include at least one of problem type and features associated with the use case. The learning attributes may include at least one of data transformation, feature engineering, model training, or prediction. The environment attributes may include at least one of operating system environment, configuration management environment, containerization attributes, or cloud or on-premises attributes.

Upon receiving the at least one of the user defined criteria, at step 204, at least one ML model may be operated for each of the plurality of stages associated with the ML model operations. Further, in order to operate each of the at least ML model, at step 206, a predefined technique from a plurality of predefined techniques may be selected for each of the at least one ML model at each of the plurality of stages. In an embodiment, the pre-defined technique may be associated with a current stage of the plurality of stages. Moreover, the predefined technique for an ML model for a stage may be selected based on the at least one of the user defined criteria. Once the pre-defined technique is selected for the current stage from the plurality of stages, at step 208, a code may be generated each of the at least one ML model at each of the plurality of stages. In an embodiment, the code may be generated based on the predefined technique selected for the current stage from the plurality of stages. In order to generate the code for the ML model at the stage, at step 210, a code configuration may be created based on the selected predefined technique and at least one of the user defined criteria. In other words, the code configuration may provide configuration parameters for each of the plurality of stages in order to generate an appropriate action (i.e., the code) based on the selected configuration parameters.

Further, at step 212, a dependency configuration may be generated for the generated code. The dependency configuration may be generated for each of the at least one ML model at each of the plurality of stages. Further, the dependency configuration for the codes may be generated based on the generated code and at least one of the user defined criteria. As will be appreciated, the dependency configuration may provide details of packages and libraries that will be required to run the generated code as a standalone entity without any dependencies. Once the dependency score is generated, at step 214, an environment configuration may be generated for the generated code. In an embodiment, the environment configuration may be generated for each of the at least one ML model at each of the plurality of stages. Further, the environment configuration may be generated based on the at least one of the user defined criteria. As will be appreciated, the environment configurations may provide configurable parameters that are required for creating at least one executable specific to environment where the code is going to run.

Further, at step 216, a pipeline configuration may be generated for execution of associated codes generated for each of the plurality of stages based on the associated dependency and environment configuration. In an embodiment, the pipeline configuration may be generated for each of the at least one ML model. Further, once the pipeline configuration is generated for each of the at least one ML model, at step 218, at least one executable code may be created. The at least one executable code created may be used for operating each of the at least one ML model. In an embodiment, the at least one executable code may include a container, a code executable, and a pipeline executable.

Figure 3:
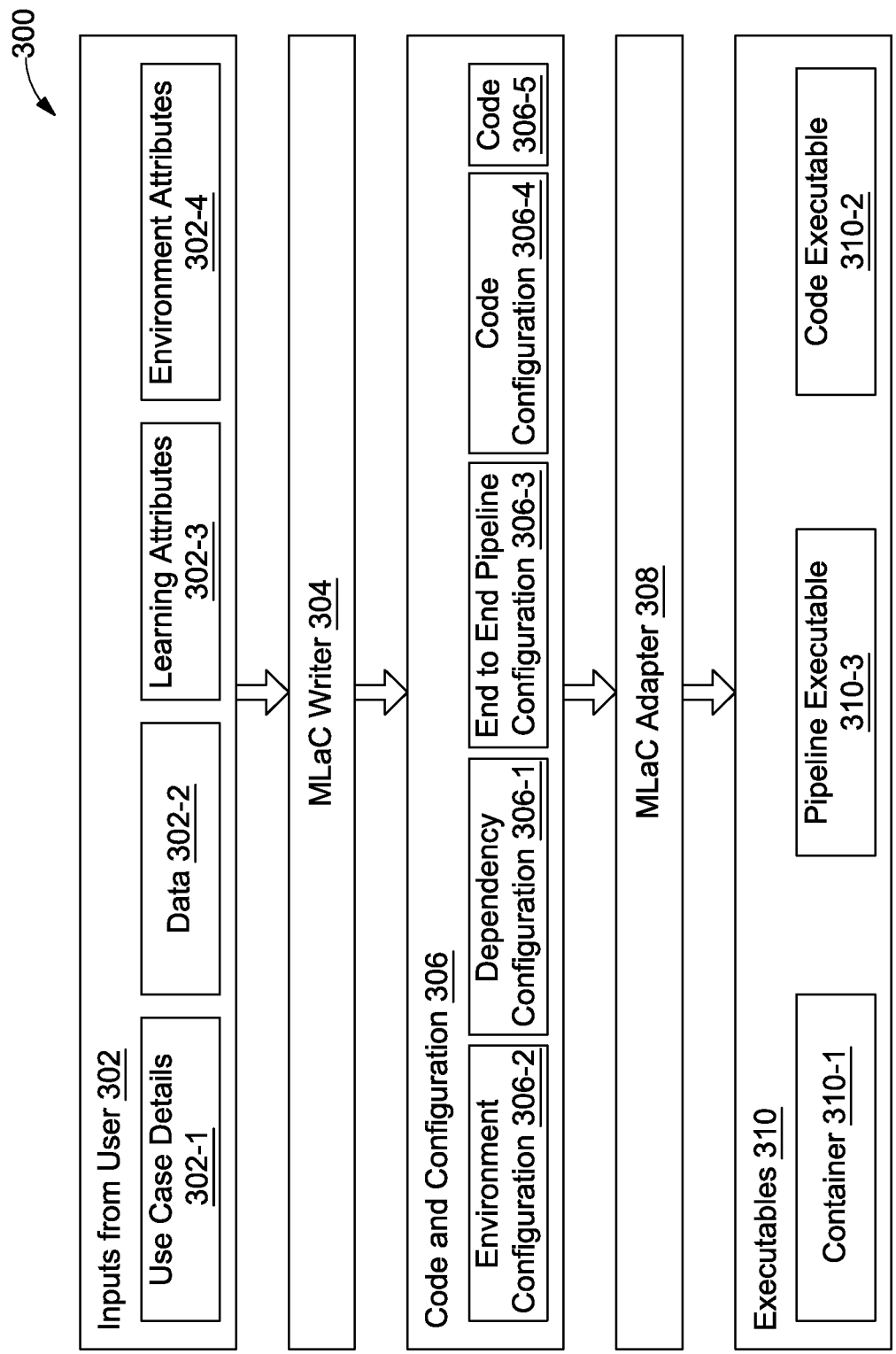
FIG. 3 illustrates a process of creating at least one executable for operating at least one ML model, in accordance with an embodiment.

Referring now to FIG. 3, a flow diagram 300 depicting a process of creating at least one executable for operating at least one ML model is illustrated in accordance with an embodiment. As depicted via the flow diagram 300, at step 302, inputs may be received from the user. The user may be a data scientist, a data analyst, a developer, and the like. With reference to FIG. 2, the inputs received from the user may correspond to the user defined criteria. The user defined criteria may include at least one of details associated with a use case 302-1, data to be used for training 302-2, learning attributes 302-3, and environmental attributes 304-4.

The use case details 302-1 may include at least one of problem type and features associated with the use case. The data 302-2 may be training dataset collected by the user. The learning attribute 302-3 may include at least one of data transformation, feature engineering, model training, or prediction. The learning attributes are further explained in detail in conjunction with FIG. 4. The environment attributes may include at least one of operating system environment, configuration management environment, containerization attributes, or cloud or on-premises attributes. Examples of operating system environment, configuration management environment, containerization attributes, or cloud or on-premises attributes may be Linux, GitHub, Docker, and Amazon Web Services (AWS) cloud, respectively.

Once the at least one of the user defined criteria are received, then ML as Code (MLaC) writer 304 may create the code configuration. In an embodiment, the code configuration may be created for each of the plurality of ML model at each of the plurality of stages. Further, the MLaC writer 304 may create the code configuration based on the selected predefined technique and the at least one of the user defined criteria. Once the code configurations are created, then based on the created code configurations, the MLaC writer 304 may generate the code by transforming the at least one of the user defined criteria based on machine learning concepts. In an embodiment, the code may be generated for each of the at least one ML model at each of the plurality of stages.

Further, once the code is generated, at step 306, i.e., code and configurations may be executed. In the step 306, once the code configuration (i.e., a code configuration 306-4) is created and the code (i.e., a code 306-5) is generated, then a dependency configuration 306-1 may be generated for the generated code. The dependency configuration 306-1 may be generated for each of the at least one ML model at each of the plurality of stages. In an embodiment, the dependency configuration 306-1 may be generated based on the generated code 306-5 and the input from user 302. Further, an environment configuration 306-2 may be generated for the generated code 306-5. The environment configuration 306-2 for each of the at least one ML model at each of the plurality of stages. In an embodiment, the environment configurations 306-2 may be generated based on the at least one of the user defined criteria. Once the dependency configuration 306-1 and the environment configuration 306-2 is generated, then, an end-to-end pipeline configuration 306-3 (i.e., the pipeline configuration) may be generated for each of the at least one ML model. The end-to-end pipeline configuration 306-3 based on the associated dependency and environment configuration. In an embodiment, the end-to-end pipeline configuration 306-3 may be generated for execution of associated codes generated for each of the plurality of stages.

Once the dependency score 306-1, the environment configuration 306-2, the end-to-end pipeline configuration 306-3, the code configuration 306-4, and the code 306-5 are generated, then a MLaC adapter 308 may create the at least one executable code, i.e., executables 310. The executables 310 may include a container 310-1, a code executable 310-2, and a pipeline executable 310-3.

In an embodiment, the containers 310-1 may store each of the dependency score 306-1, the environment score 306-2, the end-to-end pipeline configuration 306-3, the code configuration 306-4, and the code 306-5. In the container 310-1, each of the dependency score 306-1, the environment configuration 306-2, the end-to-end pipeline configuration 306-3, the code configuration 306-4, and the code 306-5 may be packaged in a self-contained unit. Further, the code executables 310-2 may be executables for a pipeline code. Further, the pipeline executables 306-3 may have end-to-end pipeline execution functionality embedded in it.

Figure 4:
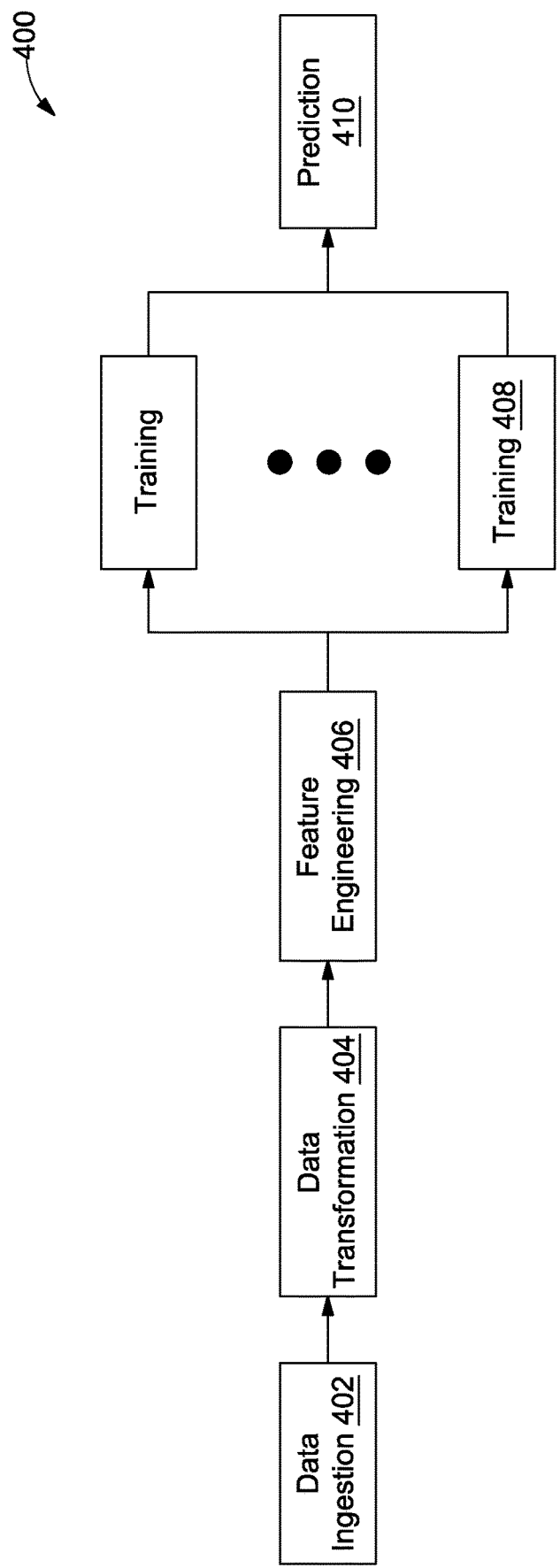
FIG. 4, illustrates a flow diagram depicting ML operation chain associated with each of at least one ML model, in accordance with an embodiment.

Referring now to FIG. 4, a flow diagram depicting ML operation chain associated with each of at least one ML model is illustrated, in accordance with an embodiment. Initially, at step 402, data ingestion may be performed to be obtained the data to be used for training each of the at least one ML model. As already known to the person skilled in the art, the data ingestion may be defined as a process of obtaining and importing data for immediate use or for storage in a database (same as the database 114). Once the data is obtained, at step 402, data transformation may be done to obtained structured data. As already known to the person skilled in the art, data transformation may be defined as a technique of converting, cleansing, and structuring data into a usable format. By way of example, the data transformation may be detection of outlier from the data using Isolation Forest, Standard Scalar normalization.

Further, at step 406, feature engineering may be performed on the data obtained after performing data transformation. In an embodiment, the feature engineering may be done to extract features from the transformed data using feature reduction or feature selection techniques (for example: correlation-based feature selection technique). Upon obtaining the features, at step 410, each of the at least one model may be trained based on the obtained features. In an embodiment, training of each of the at least one ML model may be done parallelly by creating a separate folder based on the obtained features and a corresponding ML algorithm (e.g., extreme gradient boosting (XGboost), or Light Gradient Boosting Machine (LightGBM)).

Once each of the at least one ML model are trained, then at step 412, the ML model from each of the at least one ML model. In an embodiment, the ML model may be selected based on the associated performance score. The performance score of the selected ML model may be highest among each of the at least one ML model. In an embodiment, the performance score may be determined for each of the at least one ML model based on associated operations in each of the plurality of stages. A flowchart of the method of selecting the ML model is further explained in detail in reference to FIG. 5. Once the ML model is selected, the selected ML model may be used for performing predictions on the data based on the provided features.

Figure 5:
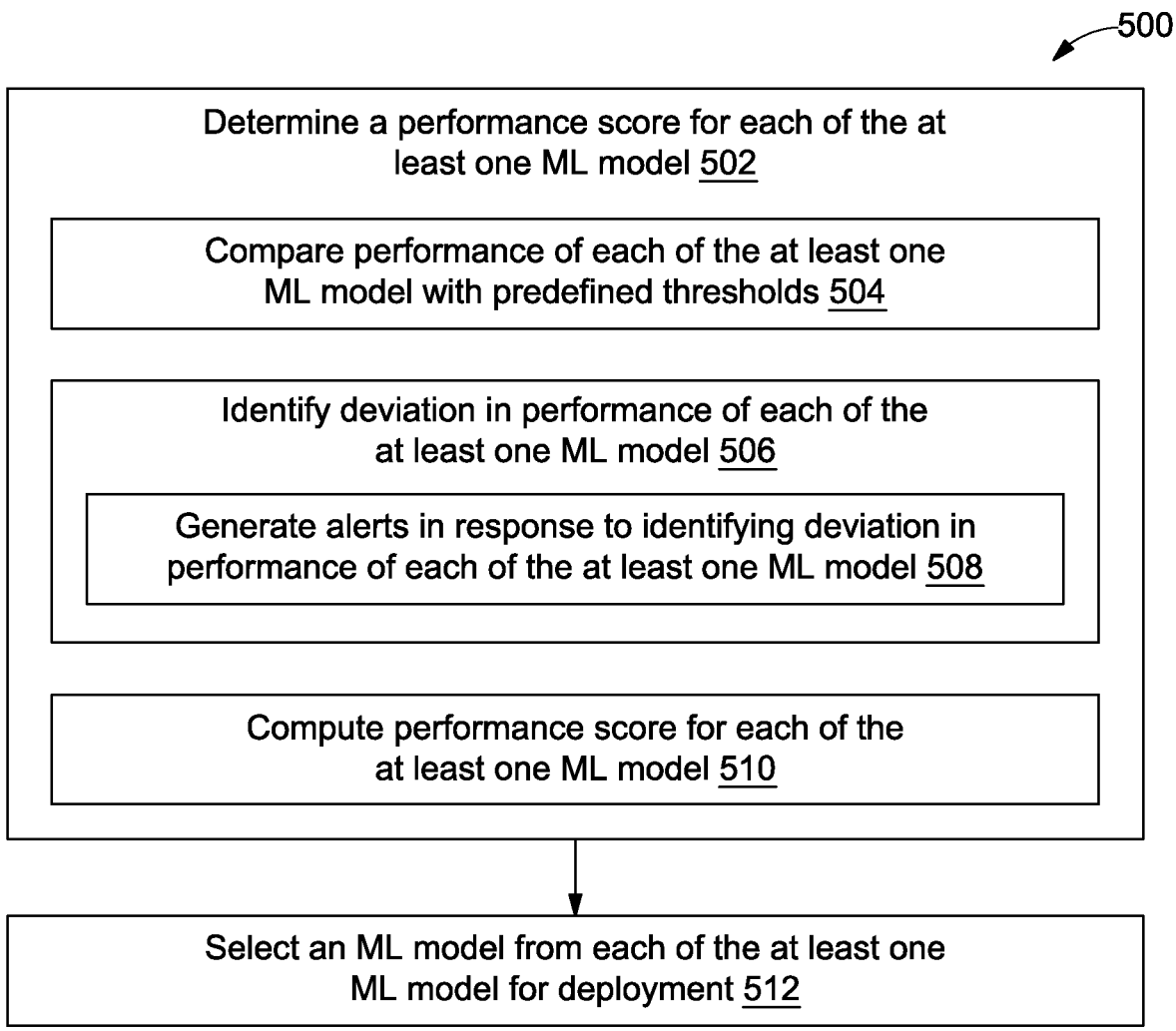
FIG. 5 illustrates a flowchart of a method for selecting an ML model from each of at least one ML model for deployment, in accordance with an embodiment.

Referring now to FIG. 5, a flowchart of method 500 for selecting an ML model from each of at least one ML model for deployment is illustrated, in accordance with an embodiment. With reference to FIG. 2, once the at least one executable code is created for each of the at least one ML model as mentioned via the step 218, then at step 502, a performance score may be determined for each of the at least one ML model. In an embodiment, the performance score may be determined based on associated operation in each of the plurality of stages. In order to determine the performance score, at step 504, performance of each of the at least one ML model may be compared with predefined thresholds.

Further, based on comparison, at step 506, deviation in performance of each of the at least one ML model may be identified. Upon identifying the deviation, at step 508, alerts may be generated in response to identifying the deviation in performance of each of the at least one ML model. Further, at step 510, performance score for each of the at least one ML model based on the identified deviations. Upon calculating the performance score, at step 512, an ML model from each of the at least one ML model may be selected for deployment. In an embodiment, the ML model may be selected based on the determined performance score. Further, the selected ML model may have highest performance score. In some embodiment, the selection of the ML model may be done based on user requirement.

Figure 6B:
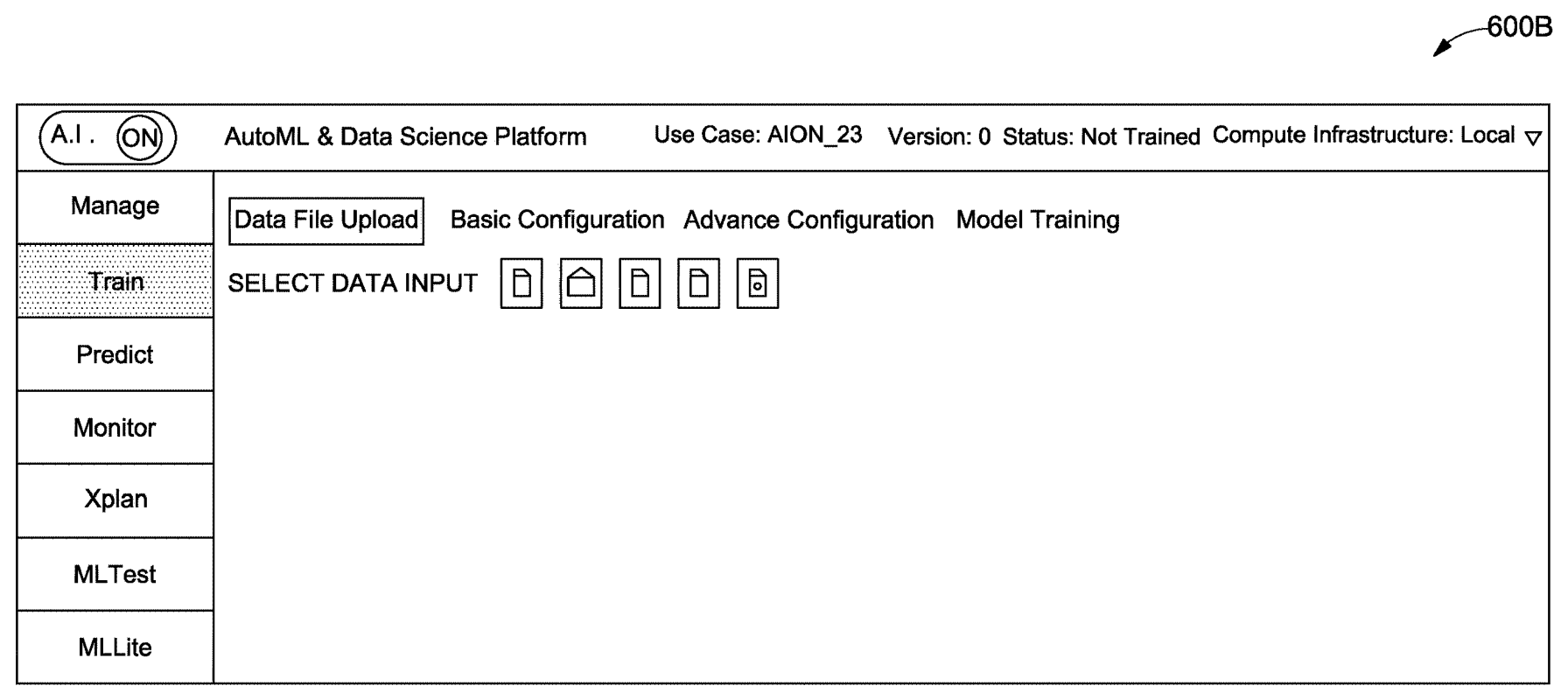
Figure 6D:
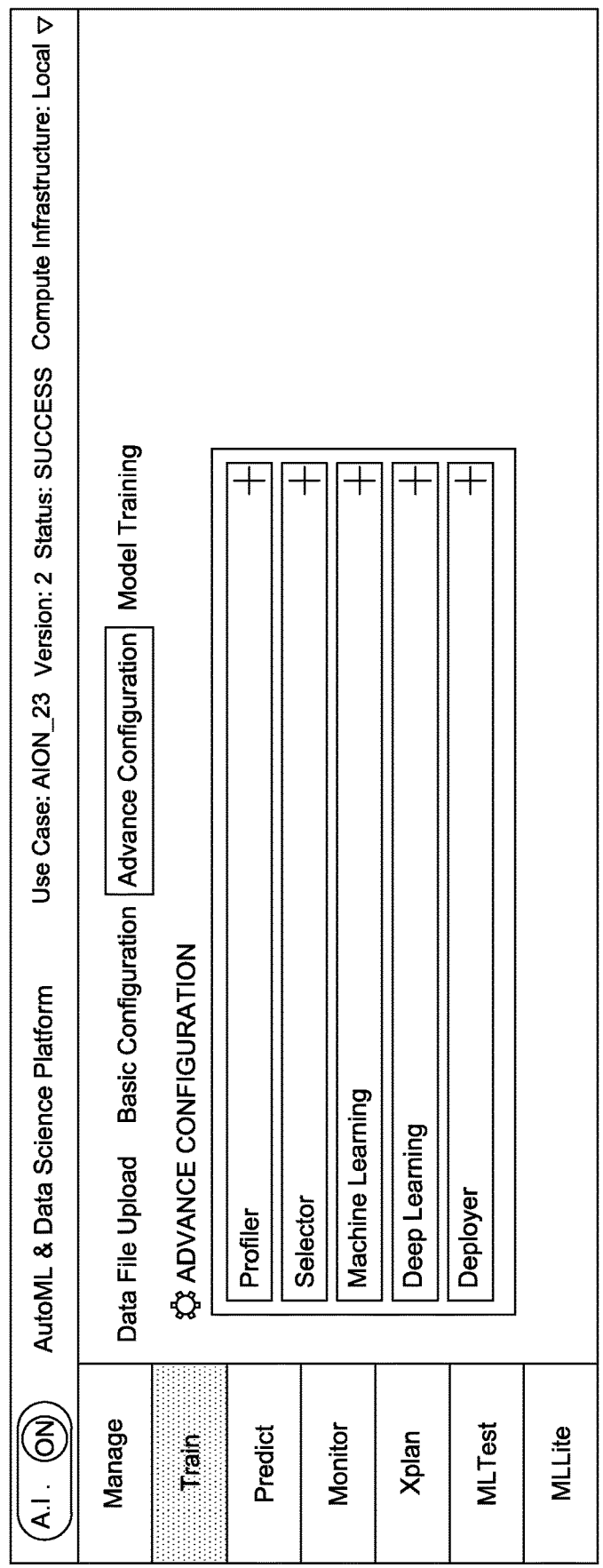

Referring now to FIGS. 6A-6E, GUIs depicting technique used for creating at least one executable for operating ML models are represented, in accordance with an exemplary embodiment. In reference to FIG. 1, the GUIs depicted in FIG. 6A-6G may be a GUI of the electronic device 102. In FIG. 6A, a GUI 600A of is represented. In the GUI 600A, a use case may be obtained from the user as an input. As depicted via the GUI 600A, the use case may correspond to a use case "AION_23". In order to provide the use case as the input, the user may need to select "manage option" from a menu bar depicted on a left side of the GUI 600A. Further, upon selecting "the manage option", the user may need to select "use cases" option. In the "use cases" option, under a "new case" title, the user may need to provide a name of the use case, i.e., "AION_23".

In some embodiment, the user may manually type the name of the use case in a box titled as "use case". In some embodiment, the user may select the use case from "a use case list" depicted on a right side of the GUI 600A. Upon selecting the use case "AION_23", the user may click on a submit button. Further, upon receiving the user input for the use case "AION_23", the user may upload the data to be used for training. In order to upload the data to be used for training, the user may select "a data upload file" option under "a track option" present on the menu bar as depicted via a GUI 600B of FIG. 6B.

Once the use case "AION_23" is selected and the data is uploaded, the user may provide details associated with the use case "AION_23", i.e., a problem type and associated features. In order to provide the problem type, the user may need to need to select the problem type, for example, classification from a drop-down list of the problem types as depicted via a GUI 600C of FIG. 6C. Further, the user may need to provide input corresponding to the features associated with the use case "AION_23". By way of an example, as depicted via the GUI 600C, the features associated with the use case may include model features (e.g., sentiments, or texts), date and time features (e.g., not applicable, sentiments, or texts), index features (e.g., not applicable, sentiments, or texts), and target features (e.g., sentiments).

Once the data and the details associated with the use case "AION_23" is obtained from the user, the user may provide input associated with learning attributes. The learning attributes may include at least one of data transformation, feature engineering, model training, or prediction. As depicted via the GUI 600D, the user may provide input for the learning attributes by selecting "an advance configuration option" within "the train option" present on the menu bar. Further, the user may need to provide input associated to the environment attribute. The environment attributes may include at least one of operating system environment, configuration management environment, containerization attributes, or cloud or on-premises attributes.

Figure 6E:
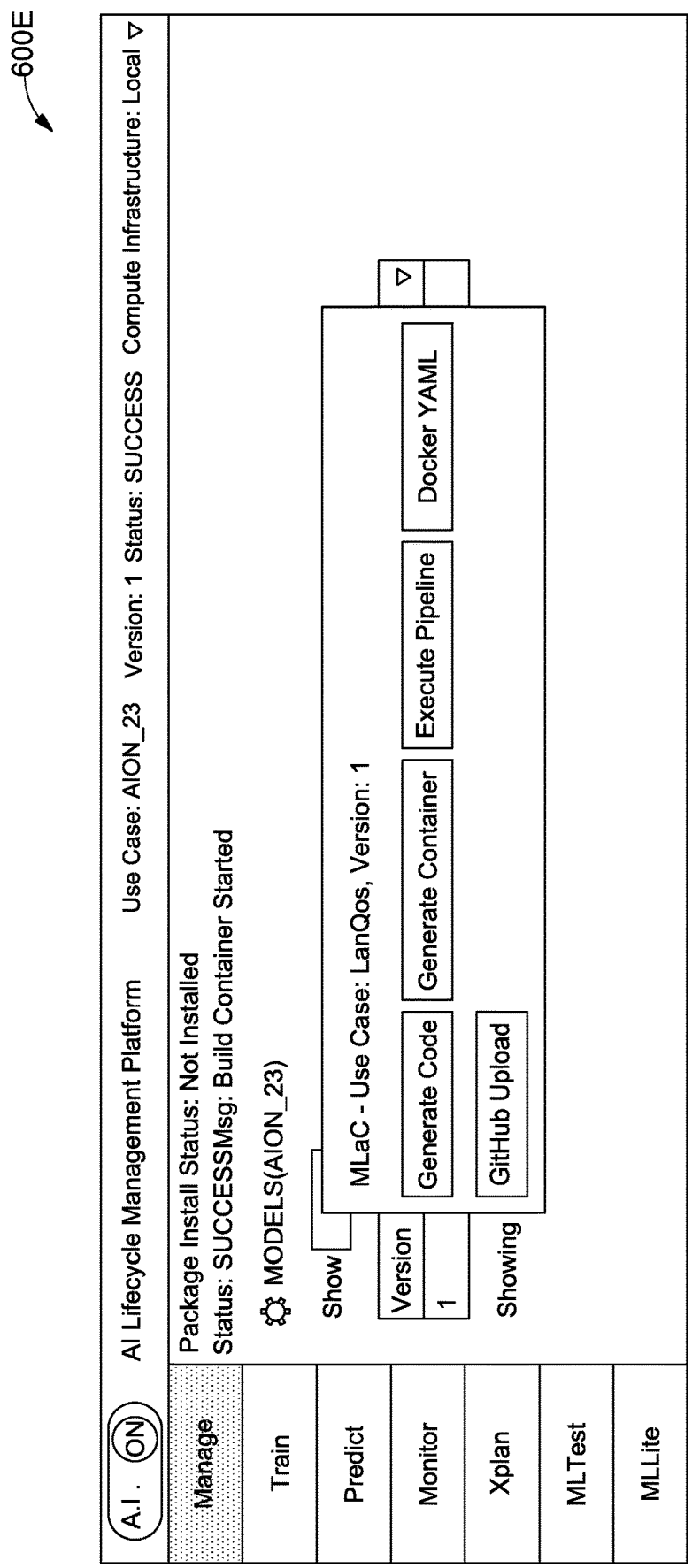

The user may generate code for each of the learning attributes by selecting "a generate code option" depicted via a GUI 600E of FIG. 6E. The code generated for each of the learning attributes may be further used to retrain the ML model with latest data. Further, for each of the learning attributes, docker container may be generated by selecting "a generate container option" depicted via the GUI 600E. Further, the user may execute the docker container generated for each of the learning attributes as a pipeline by selecting "an execute pipeline option" depicted via the GUI 600E. Further, the user may generate a docker compose Yet another markup language (YAML) file for the pipeline by selecting "a docker YAML option" as depicted via the GUI 600E. This docker compose YAML file may be further used to build and execute pipeline container using a docker compose up command. Further, the user may upload the generated code, i.e., the docker compose YAML file to the configuration management environment, i.e., GitHub by selecting "a GitHub upload option" as depicted via the GUI 600E. Upon receiving user input, the code may be generated for each of the at least one ML model at each of the plurality of stages. This has been already explained in detail in above FIG. 2 and FIG. 3. Once the code is generated the at least one executable may be created for operating each of the at least one ML model.

Various embodiments provide method and system for automatically generating codes to operate Machine Learning (ML) models. The disclosed method and system may operate, for each of a plurality of stages associated with ML model operations, at least one ML model. To operate each of the at least one ML model, the disclosed method and system may select, for each of the at least one ML model at each of the plurality of stages, a predefined technique from a plurality of predefined techniques associated with a current stage of the plurality of stages. The predefined technique for an ML model for a stage may be selected based on at least one of user defined criteria. To operate each of the at least one ML model, the disclosed method and system may generate, for each of the at least one ML model at each of the plurality of stages, a code based on a predefined technique selected for a current stage from the plurality of stages. To operate each of the at least one ML model, the disclosed method and system may generate, for each of the at least one ML model at each of the plurality of stages, a dependency configuration for the generated code based on the generated code and at least one of the user defined criteria. To operate each of the at least one ML model, the disclosed method and system may generate, for each of the at least one ML model at each of the plurality of stages, an environment configuration for the generated code based on at least one of user defined criteria. To operate each of the at least one ML model, the disclosed method and system may generate, for each of the at least one ML model, a pipeline configuration for execution of associated codes generated for each of the plurality of stages, based on the associated dependency and environment configuration.

The disclosed method and system may provide some advantages like, the disclosed method and the system may enable user (e.g., a developer) to automatically generate machine learning pipeline code (i.e., the code generated for each of the at least one ML model) and operationalize the code in production. Further, the disclosed method and system may allow users to easily train an ML model (or a deep learning model). Further, based upon the configuration applied during the training, the disclosed method and system may automatically generate code for the ML model which may be further used to retrain the ML model in production environment for running the code as the pipeline. The disclosed method and system may automatically containerize the code which can run on its own without any manual intervention. In addition, the disclosed method and system may be scalable to include any additional components for automatically generating codes to operate ML models. Moreover, the disclosed method and system may accelerate productionizing of the ML models by automating entire ML operations process, thereby saving a huge amount of time and money.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for automatically generating codes to operate Machine Learning (ML) models, the method comprising:
   operating, for each of a plurality of stages associated with ML model operations, at least one ML model, wherein operating each of the at least one ML model comprises:
   selecting, for each of the at least one ML model at each of the plurality of stages, a predefined technique from a plurality of predefined techniques associated with a current stage of the plurality of stages, wherein the predefined technique for an ML model for a stage is selected based on at least one of user defined criteria;
   generating, for each of the at least one ML model at each of the plurality of stages, a code based on the predefined technique selected for the current stage from the plurality of stages;
   generating, for each of the at least one ML model at each of the plurality of stages, a dependency configuration for the generated code based on the generated code and atleast one of the user defined criteria;
   generating, for each of the at least one ML model at each of the plurality of stages, an environment configuration for the generated code based on at least one of user defined criteria;
   generating, for each of the at least one ML model, a pipeline configuration for execution of associated codes generated for each of the plurality of stages, based on the associated dependency and environment configuration; and
   creating at least one executable for operating each of the at least one ML model, wherein the at least one executable comprises a container, a code executable, and a pipeline executable.

2. The method of claim 1 further comprising:
   determining a performance score for each of the at least one ML model based on associated operation in each of the plurality of stages; and
   selecting an ML model from each of the at least one ML model for deployment, wherein the ML model has the highest performance score.

3. The method of claim 2, wherein determining the performance score comprises:
   comparing performance of each of the at least one ML model with predefined thresholds;
   identifying deviation in performance of each of the at least one ML model based on the comparing; and
   computing performance score for each of the at least one ML model based on the identified deviations.

4. The method of claim 3, further comprising generating alerts in response to identifying deviation in performance of each of the at least one ML model.

5. The method of claim 1 further comprising receiving at least one of user defined criteria, wherein the user defined criteria comprise at least one of details associated with a use case, data to be used for training, learning attributes, and environmental attributes.

6. The method of claim 5, wherein details associated with the use case comprises at least one of problem type and features associated with the use case.

7. The method of claim 5, wherein the learning attributes comprise at least one of data transformation, feature engineering, model training, or prediction.

8. The method of claim 5, wherein the environmental attributes comprise at least one of operating system environment, configuration management environment, containerization attributes, or cloud or on-premises attributes.

9. The method of claim 1, wherein automatically generating the code for each of the at least one ML model at the current stage comprises creating a code configuration based on the selected predefined technique and at least one of the user defined criteria.

10. The method of claim 1, wherein the plurality of stages comprises at least one of: data pre-processing, feature selection, model training, model validation, model deployment, or model monitoring.

11. A system for automatically generating codes to operate Machine Learning (ML) models, the system comprising:
   a processor; and
   a memory coupled to the processor, wherein the memory stores processor-executable instructions, which, on execution, causes the processor to:
      operate, for each of a plurality of stages associated with ML model operations, at least one ML model, wherein, to operate each of the at least one ML model, the processor-executable instructions further cause the processor to:
         select, for each of the at least one ML model at each of the plurality of stages, a predefined technique from a plurality of predefined techniques associated with a current stage of the plurality of stages, wherein the predefined technique for an ML model for a stage is selected based on at least one of user defined criteria;
         generate, for each of the at least one ML model at each of the plurality of stages, a code based on the predefined technique selected for the current stage from the plurality of stages;
         generate, for each of the at least one ML model at each of the plurality of stages, a dependency configuration for the generated code based on the generated code and at least one of the user defined criteria;
         generate, for each of the at least one ML model at each of the plurality of stages, an environment configuration for the generated code based on at least one of user defined criteria;
         generate, for each of the at least one ML model, a pipeline configuration for execution of associated codes generated for each of the plurality of stages, based on the associated dependency and environment configuration; and
         create at least one executable for operating each of the at least one ML model, wherein the at least one executable comprises a container, a code executable, and a pipeline executable.

12. The system of claim 11, wherein the processor-executable instructions further cause the processor to:
   determine a performance score for each of the at least one ML model based on associated operation in each of the plurality of stages; and
   select an ML model from each of the at least one ML model for deployment, wherein the ML model has the highest performance score.

13. The system of claim 12, wherein, to determine the performance score, the processor-executable instructions further cause the processor to:
   compare performance of each of the at least one ML model with predefined thresholds;
   identify deviation in performance of each of the at least one ML model based on the comparing; and
   compute performance score for each of the at least one ML model based on the identified deviations.

14. The system of claim 13, wherein the processor-executable instructions further cause the processor to generate alerts in response to identifying deviation in performance of each of the at least one ML model.

15. The system of claim 11, wherein the processor-executable instructions further cause the processor to receive at least one of user defined criteria, wherein the user defined criteria comprise at least one of details associated with a use case, data to be used for training, learning attributes, and environmental attributes.

16. The system of claim 15, wherein details associated with the use case comprises at least one of problem type and features associated with the use case, and wherein the learning attributes comprise at least one of data transformation, feature engineering, model training, or prediction, and wherein the environmental attributes comprise at least one of operating system environment, configuration management environment, containerization attributes, or cloud or on-premises attributes.

17. The system of claim 11, wherein, to automatically generate the code for each of the at least one ML model at the current stage, the processor-executable instructions further cause the processor to create a code configuration based on the selected predefined technique and at least one of the user defined criteria.

18. The system of claim 11, the plurality of stages comprises at least one of: data pre-processing, feature selection, model training, model validation, model deployment, or model monitoring.

* * * * *